(12) United States Patent
Crotty et al.

(10) Patent No.: US 10,569,109 B2
(45) Date of Patent: Feb. 25, 2020

(54) RESPIRATORY FILTERING FABRIC AND GARMENT MADE THEREFROM

(71) Applicant: Cocoon, Inc., North Hampton, NH (US)

(72) Inventors: Leo J. Crotty, New Castle, NH (US); Karmin Olson, Kansas City, KS (US); Alan Smithies, Overland Park, KS (US)

(73) Assignee: L&C Protec, Inc., North Hampton, NH (US)

( * ) Notice: Subject to any disclaimer, the term of this patent is extended or adjusted under 35 U.S.C. 154(b) by 0 days.

(21) Appl. No.: 16/432,253

(22) Filed: Jun. 5, 2019

(65) Prior Publication Data
US 2020/0009409 A1 Jan. 9, 2020

Related U.S. Application Data

(63) Continuation-in-part of application No. 14/994,233, filed on Jan. 13, 2016, now abandoned.

(51) Int. Cl.
*B01D 53/22* (2006.01)
*A62B 23/02* (2006.01)
(Continued)

(52) U.S. Cl.
CPC ............ *A62B 23/025* (2013.01); *A41D 23/00* (2013.01); *A41D 31/02* (2013.01); *A42B 1/046* (2013.01); *B01D 39/083* (2013.01); *B01D 39/163* (2013.01); *B01D 46/543* (2013.01); *B32B 5/022* (2013.01); *B32B 5/024* (2013.01);
(Continued)

(58) Field of Classification Search
CPC .... A62B 23/025; A62B 17/003; A41D 23/00; A41D 31/02; A41D 13/11; A41D 2500/20; A42B 1/046; B01D 39/083; B01D 39/163; B01D 46/543; B01D 2239/0681; B32B 5/022; B32B 5/024; B32B 5/026; B32B 7/12; B32B 27/12; B32B 27/322;
(Continued)

(56) References Cited

U.S. PATENT DOCUMENTS 5,740,551 A * 4/1998 Walker ............... A41D 19/0006
2/16
6,391,807 B1 * 5/2002 Jariwala ............... B01D 39/163
264/147

(Continued)

*Primary Examiner* — Anthony R Shumate

(57) ABSTRACT

An enhanced filtration multilayer laminated fabric includes an air permeable, moisture-vapor-transmissive central layer such as polytetra-fluoroethylene (ePTFE) sandwiched between a first pair of nonwoven textile layers and a second pair of woven textile layers. The laminated fabric may also feature a fire resistant application. The top textile layer may also include a permanent, highly breathable and highly durable electro-static discharge feature added to the inside of the layer by laying down a carbon based printed pattern on the inside of the layer. The filtration fabric may be utilized to manufacture a wearable garment that is aesthetically pleasing and comfortable to wear in all weather conditions and which effectively filters airborne particulates from entering a user's respiratory system by blocking particulates having a size of 0.3 microns and larger from inhaled air for a user's respiratory system with a particle blocking efficiency of at least 90%.

14 Claims, 1 Drawing Sheet

(51) Int. Cl.
    *A42B 1/04* (2006.01)
    *A41D 23/00* (2006.01)
    *B01D 39/08* (2006.01)
    *B01D 39/16* (2006.01)
    *B01D 46/54* (2006.01)
    *B32B 27/12* (2006.01)
    *B32B 27/32* (2006.01)
    *B32B 5/02* (2006.01)
    *B32B 7/12* (2006.01)
    *A41D 31/02* (2019.01)
    *A41D 13/11* (2006.01)
    *A62B 17/00* (2006.01)

(52) U.S. Cl.
    CPC ............... *B32B 5/026* (2013.01); *B32B 7/12* (2013.01); *B32B 27/12* (2013.01); *B32B 27/322* (2013.01); *A41D 13/11* (2013.01); *A41D 2500/20* (2013.01); *A62B 17/003* (2013.01); *B01D 2239/0681* (2013.01); *B32B 2250/05* (2013.01); *B32B 2250/40* (2013.01); *B32B 2307/724* (2013.01); *B32B 2307/73* (2013.01); *B32B 2437/00* (2013.01)

(58) Field of Classification Search
    CPC ............ B32B 2250/05; B32B 2250/40; B32B 2307/724; B32B 2307/73; B32B 2437/00
    See application file for complete search history.

(56) References Cited

U.S. PATENT DOCUMENTS

| | | | | |
|---|---|---|---|---|
| 6,422,396 B1 * | 7/2002 | Li | ................. | B01D 17/0214 210/489 |
| 6,716,778 B1 * | 4/2004 | Hottner | ................. | A41D 27/245 442/199 |
| 2003/0106294 A1 * | 6/2003 | Chung | ................. | B01D 39/163 55/486 |
| 2004/0116022 A1 * | 6/2004 | Langley | ................. | A41D 31/02 442/289 |
| 2005/0133035 A1 * | 6/2005 | Yahiaoui | ............ | A41D 13/1184 128/206.19 |
| 2008/0096001 A1 * | 4/2008 | Emden | ................. | A41D 31/02 428/222 |
| 2009/0266048 A1 * | 10/2009 | Schwarz | ............ | B01D 39/1692 60/39.092 |
| 2010/0279086 A1 * | 11/2010 | Park | ................. | B32B 27/12 428/201 |
| 2011/0119815 A1 * | 5/2011 | Paulson | ................. | A42B 1/046 2/424 |
| 2011/0171458 A1 * | 7/2011 | Burger | ................. | B32B 27/12 428/319.3 |
| 2011/0262699 A1 * | 10/2011 | Yializis | ................. | B32B 15/08 428/138 |
| 2012/0141719 A1 * | 6/2012 | Payne | ................. | B32B 3/266 428/68 |
| 2013/0183490 A1 * | 7/2013 | Hsueh | ................. | C08J 7/18 428/141 |
| 2013/0192344 A1 * | 8/2013 | Bryan | ................. | B01D 65/102 73/38 |
| 2013/0224467 A1 * | 8/2013 | Hirao | ................. | C08F 2/32 428/221 |
| 2013/0327218 A1 * | 12/2013 | Izzi | ................. | B01D 46/0082 95/281 |
| 2014/0137569 A1 * | 5/2014 | Parish | ................. | F25B 21/02 62/3.2 |
| 2019/0234013 A1 * | 8/2019 | Xing | ................. | A41B 17/00 |

* cited by examiner

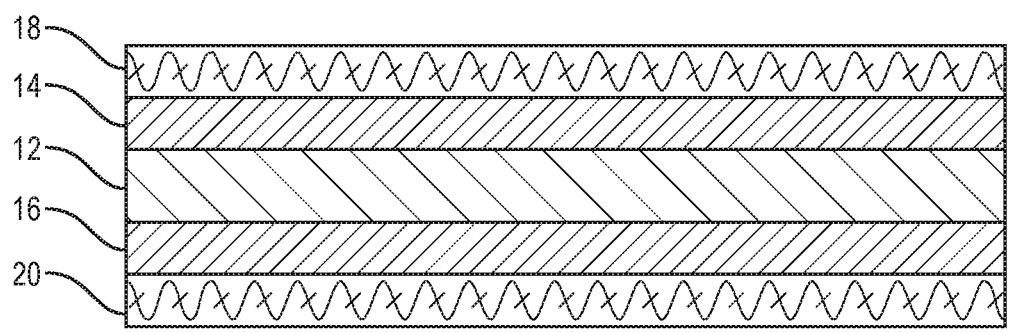

RESPIRATORY FILTERING FABRIC AND GARMENT MADE THEREFROM

CROSS-REFERENCE TO RELATED APPLICATIONS

This application is a Continuation-in-Part of U.S. patent application Ser. No. 14/994,233 filed Jan. 13, 2016 entitled "Respiratory Filtering Fabric And Garment Made Therefrom", which in turn claims priority from U.S. Provisional Patent Application No. 62/103,137 entitled "Respiratory Filtering Fabric And Garment Made Therefrom" filed on Jan. 14, 2015, both of which are incorporated fully herein by reference.

TECHNICAL FIELD

The present invention relates to filtration fabrics and more particularly, to a filtration fabric which has significant air permeability provided by an ePTFE layer in the center of the fabric, and which fabric may be utilized to manufacture a wearable garment that is aesthetically pleasing and comfortable to wear in all weather conditions, and can serve the additional function of filtering all types of harmful particulates from the air inhaled by the user.

BACKGROUND INFORMATION

Respirators and masks are generally used to prevent aspiration of airborne particulates. Airborne particulates may include smoke caused by a fire or explosion; smoke and gunpowder pollutants from gunfire; blowing sand such as in the desert; and even contaminants from open sewage pits, as are often found in third-world countries or war-torn regions. Although respirators and masks are the most common solution, many individuals do not feel comfortable wearing them, and indeed, feel out of place wearing a respirator, or even a mask. Further, because of the cumbersome nature of traditional respirators, in practice many people resort to pulling a t-shirt or handkerchief up over their face to act as a crude filter when they find themselves in dusty or smoky situations.

Current respiratory materials provide reasonably good air permeability initially. However, these materials quickly become "clogged" with contaminants as the process of "capturing" the contaminants also reduces the size of the pores through which the air travels through the respiratory materials. This in turn decreases the air flow and increases the force necessary to draw in enough oxygen, essentially making it more and more difficult to breathe. In addition, these masks or respirators are generally not fire retardant, nor are they waterproof or Electro-Static Discharge (ESD) resistant. This is particularly problematic in cold regions where any moisture in the mask will freeze, again causing clogging of the respiratory materials, and essentially making the mask unusable.

The current invention allows for not only good particulate release during exhalation, but because all areas of the garment are capable of filtration, it can be rotated if necessary to a clean, unused area (in scarf form). The garment is also completely unaffected by moisture.

Accordingly, what is needed is a fabric that serves as an air filtration material and provides significant air permeability without becoming clogged with particulates or moisture and which fabric can be utilized in the making of aesthetically pleasing clothing items such as scarfs, balaclavas, shemaghs, masks, face shields and the like.

SUMMARY

In accordance with an exemplary embodiment of this invention, the present invention provides for a multilayer fabric which provides air filtration. The multilayer fabric is composed of several layers of different materials. The multiple layers include a central layer (film or membrane) preferably of expanded polytetrafluoroethylene (ePTFE) or other similar hydrophobic material having good air permeability and moisture-venting properties. Other similar hydrophobic and moisture-venting materials include, but are not limited to, electrospun or force spun nanofiber membranes exhibiting similar air permeability and moisture-venting properties, or nonwoven media with similar pore sizes. Methods of producing such a nanofiber membrane include force-spinning technology, electrospinning, or other similar methods known to those skilled in the art.

This central layer is sandwiched between a first pair of textile layers. These three layers are then in turn sandwiched between a second pair of textile layers. In this arrangement, the ePTFE membrane is effectively sandwiched between two (2) layers on each side of the membrane creating a five (5) layer laminate or composite.

Textiles suitable for the first pair of textile layers include spun bond or nonwoven fabric. These layers are ultrasonically point bonded on opposite sides of the central layer. The first pair of textile layers serve to protect the central layer such as an ePTFE membrane from damage, and allow space for the membrane/central layer to breathe. The first pair of textile layers also provide a solid anchor point for the adhesive lamination of the outer fabric layers.

Textiles suitable for the second pair of textile layers include woven fabric such as aramid or, jersey knit layers, or other textile layers with adequate air permeability so as to not restrict breathing. In one embodiment these layers are hot-melt adhesively bonded to opposite sides of the first pair of spun bound fabric textile layers. In another embodiment the second pair of textile layers are layered on opposite sides of the first pair of spun bound fabric textile layers and all layers are durably joined at the peripheral edges of the 5 layer composite through adhesive bonding, welding or stitching.

The design of the multilayer fabric allows for selection of a wide variety of other face fabrics to be used. For example, fleece or wool fabrics for cold weather use, or self-cooling hydrophilic printed fabrics (Omnifreeze) for hot weather use. The fabrics can also be printed with an ESD grid prior to lamination to allow use of the garment in spark sensitive environments.

The multilayer fabric may be plasma treated for oleophobic and hydrophobic properties. This treatment allows the garment to repel water and resist contamination by oily substances, and allows for easy cleaning in the field. The garment will not absorb water and thus will maintain adequate air flow, even in heavy precipitation. The multilayer fabric may also include a conductive layer printed on an inside surface of a woven fabric layer.

Various embodiments for use of the multilayer fabric include the manufacture of garments such as scarves, balaclavas, shemaghs, masks, face shields, the upper portion of an extended turtleneck shirt, neck gaiters, face panels, and mouth covers and the like.

The invention features an air permeable multilayer fabric configured for being formed into a garment providing air filtration to a user's respiratory system and configured for placement in part in front of a user's mouth and nose, and for providing inhaled air filtration for a user's respiratory system, the air permeable multilayer fabric garment having an overall air permeability rating of greater than 15 CFM.

The air permeable multilayer fabric garment comprises central layer (film or membrane) preferably of expanded polytetrafluoroethylene (ePTFE) or other similar hydrophobic material having good air permeability and moisture-venting properties and having a top surface and a bottom surface and a first air permeability rating of greater than 15 CFM. The central layer is configured for blocking particulates having a size of 0.3 microns and larger from the inhaled air for a user's respiratory system through the air permeable, multilayer, air filtering fabric garment, with a particle blocking efficiency of at least 90%. Similar properties have also been achieved from central layer membranes made from polyamide and polyurethane nanofibers.

First and second air permeable nonwoven layers are provided, wherein the first air permeable nonwoven layer is bonded to or proximate the top surface of the air permeable and hydrophobic central layer or membrane, and the second air permeable nonwoven layer is bonded to the bottom surface of the air permeable and hydrophobic central layer or membrane. The first and second air permeable nonwoven layers have a second air permeability rating which is greater than the first air permeability rating of the central layer.

First and second air permeable fabric layers are provided, wherein the first air permeable fabric layer is disposed adjacent an outer surface of the first air permeable nonwoven layer opposite the top surface of the central layer or membrane, and wherein the second air permeable fabric layer is disposed adjacent an outer surface of the second air permeable nonwoven layer opposite the bottom surface of the air permeable central layer or membrane. The first and second air permeable fabric layers have a third air permeability rating which is greater than the second air permeability rating of the first and second air permeable nonwoven layers.

The air permeable central layer/membrane and the air permeable nonwoven layers may be treated with a gas plasma applied fluoro monomer treatment, configured for rendering the air permeable central layer/membrane and the air permeable nonwoven layers oleophobic and hydrophobic.

The in central/membrane layer and the first and second air permeable fabric layers are configured such that the particulates blocked by the central/membrane layer and the first and second air permeable fabric layers can be dislodged by applying an exhale air flow by the user in a direction opposite the inhaled air flow.

In one embodiment, the first and second air permeable fabric layers are jersey knit layers. In another embodiment, the air permeable multilayer fabric may further include a conductive layer printed on an inside surface of at least one of the first and second air permeable fabric layers that is adjacent at least one of the first and second air permeable nonwoven layers.

The air permeable multilayer fabric the present invention may be used to manufacture a garment selected from the group of garments consisting of a face mask, a turtleneck, a balaclava, a scarf, a face shield, a neck gaiter and a shemagh.

In another embodiment, the first air permeable nonwoven layer is bonded to the top surface of the air permeable central layer/membrane in a bonding pattern which maintains an overall air permeability of greater than 15 CFM for the bonded, air permeable multilayer fabric, and wherein the second air permeable nonwoven layer is bonded to the bottom surface of the air permeable central layer/membrane in a bonding pattern which maintains an overall air permeability of greater than 15 cfm for the bonded, air permeable multilayer fabric.

In yet another embodiment, the first air permeable fabric layer is bonded to an outer surface of the first air permeable nonwoven layer opposite the central layer/membrane in a bonding pattern which maintains an overall air permeability of greater than 15 CFM for the bonded, air permeable multilayer fabric, and wherein the second air permeable fabric layer is bonded to an outer surface of the second air permeable nonwoven layer opposite the air permeable central layer/membrane in a bonding pattern which maintains an overall air permeability of greater than 15 CFM for the bonded, air permeable multilayer fabric.

In one embodiment, the first air permeable nonwoven layer is ultrasonically point bonded to the top surface of the air permeable central layer/membrane and the second air permeable nonwoven layer is ultrasonically point bonded to the bottom surface of the air permeable central layer/membrane.

In another embodiment, the first air permeable fabric layer is hot-melt adhesively bonded to an outer surface of the first air permeable nonwoven layer opposite the central layer/membrane and wherein the second air permeable fabric layer is hot-melt adhesively bonded to an outer surface of the second air permeable nonwoven layer opposite the air permeable central layer/membrane.

BRIEF DESCRIPTION OF THE DRAWINGS

These and other features and advantages of the present invention will be better understood by reading the following detailed description, taken together with the drawings wherein:

FIG. 1 is a cross-sectional view of an embodiment of the filtration fabric according to the present invention having a central ePTFE layer and multiple external layers.

DETAILED DESCRIPTION OF THE PREFERRED EMBODIMENTS

The invention features a multilayer laminated fabric that is preferably made into a garment. As a fashion forward textile, the laminated fabric of the present invention may be used to manufacture scarves, balaclavas, shemaghs, masks, face shields, the upper portion, at least, of an extended turtleneck shirt, and the like. Any article of clothing, article designed and configured to be worn over the face (mouth and/or nose) of the user) or the like made from the fabric disclosed herein can be utilized in warm weather conditions or cold weather conditions, such as for skiing, snow shoeing, snowboarding, cross-country skiing, and the like.

Additional features of the invention include: exhibiting a high air permeability (greater than 15 and preferably greater than 20 CFM); self-cleaning in that exhaling will dislodge any trapped particulates from the fabric since the mechanism of filtration uses a gradient in trapping particulates in the various layers—the outer fabric layer provides coarse filtration, the spun-bond middle layer provides a finer filtration, and any fine particles that do reach the ePTFE membrane/central layer are stopped on the surface of the membrane. Upon exhalation, the particles are easily released from the structure all the while the structure remains waterproof and can be made to be fire retardant and antistatic so that when the fabric is used in a military application around explosive ordinance, there is no risk of unintended explosion.

As shown in the enclosed drawing, the invention is, in the preferred embodiment, a five layer structure forming a multilayer filtration fabric 10. In order to be used to manufacture clothing items such as scarves, balaclavas, shemaghs, masks, face shields, the upper portion, at least, of an extended turtleneck shirt and the like, this fabric may comprise a sheet of any predetermined length, width and form, which may later be incorporated or fashioned into a final product. Alternatively, the multilayer filtration fabric 10 may be cut and sewn to fit a specific desired design as a final product with a desire to minimize stitch holes that could allow particulate to come through.

In one embodiment, the fabric 10 includes at least five layers, wherein the central layer 12 is, in the preferred embodiment, an expanded PTFE (polytetrafluoroethylene) membrane 12. The membrane 12 has air permeability from about 20 to about 30 cfm and pore size of about 1.5-3.0 microns. An exemplary central layer/membrane 12 is TG4 available from TTG, Inc. which has an approximate air permeability of 24 cfm and an approximate pore size of 2.0 microns. Other similar hydrophobic materials include electrospun or force spun nanofiber membranes, or nonwoven media with similar pore sizes.

In this embodiment, when the membrane or central layer 12 is sandwiched between a first pair 14/16 of nonwoven textile layers, the fabric 10 has been shown to block particulates of size 0.3 microns in diameter or larger with a blocking efficiency of at least 90%.

Due to the nature and structure of the ePTFE membrane 12, during use, any particulates that are drawn through the outer fabric layers towards the central ePTFE membrane are prevented from passing into the membrane 12. Therefore, instead of becoming filtered by being trapped or lodged within the interstices of the membrane 12, these filtered particulates remain solely on the outer surface of the membrane 12. Thus, the membrane 12 and outer fabric layers can be cleared of any filtered particulates by simply exhaling and applying air flow in a direction opposite that of inhaling.

Particulates are therefore removed by applying some airflow in a direction opposite that from which the air originally flowed relative to the membrane 12, or the garment (such as a scarf for example only) can be shifted to allow breathing to occur through a new, unused area of the garment The central layer/ePTFE membrane 12 is, in one embodiment, an interior expanded polytetrafluoroethylene (ePTFE) layer with hydrophobic, good air permeability, and moisture-vapor-transmission properties. The expansion of polytetrafluoroethylene opens billions of microscopic pores in the ePTFE membrane 12 to enhance air permeability and water vapor transmission rate.

The entire finished laminate may be treated to be both oleo-phobic and hydrophobic.

Frozen moisture or condensation is the primary cause of the clogging that occurs to facial masks when used in colder climates. In a preferred embodiment, the filtration fabric of this invention allows for sufficient water repellency even in colder weather so the risk of clogging from frozen condensation is minimized.

The central layer/ePTFE membrane 12 is, in the preferred embodiment, ultrasonically point-bonded between two layers 14 and 16 of about twenty weight (GSM) polyester spun bound or nonwoven material. An exemplary material for layers 14 and 16 is available from Bondex. This material has air permeability of about 300 to about 500 cfm.

As shown in the FIGURE, the first pair of textile layers 14 and 16 are preferably identical to one another and serve to protect the ePTFE membrane layer 12 from damage and clogging by larger particulates, and provide a stronger anchor point for the ePTFE membrane layer 12 to the outside layers 18 and 20 of the fabric. Most importantly, however, these layers 14 and 16 allow the maintenance of maximum air flow. The "peel" strength of the fabric structure configured according to the teachings of the present invention increased from about 0.5 lbs/in to 2 lbs/in when comparing the three layer knit-membrane-knit to the knit-sb-membrane-sb knit composite of the invention, but the most important reasons for the layers are membrane durability and to maintain the air flow and allow flexibility of outer fabric selection.

The ultrasonic point bonding between the two layers 14 and 16 and the central/ePTFE layer 12 is performed with enough bonding sites to sufficiently adhere or bond the layers together while not significantly interfering with the air flow. Thus, this process maximizes the air flow from the outside of the fabric into and through the ePTFE layer. An exemplary ultrasonic point-bonding converter is Beckmann Converting in Amsterdam N.Y. An exemplary pattern is the "BC" pattern with the number of bonding sites per square inch is about 8 to about 10.

Finally, outer layers 18 and 20 are adhered to the spun bond layers 14 and 16 using a hot-melt adhesive pattern. The outside layers 18 and 20 are typically a woven, fleece or knit fabric, such as an aramid Jersey knit SD 1883 produced by SSM Industries with air permeability of about 250 to 400 cfm and inherent flame resistant properties. In another embodiment, all of the layers of the fabric 10 may be attached together at their periphery by adhesive, stitching of other appropriate means while in another embodiment, the central layer 12 and the two layers 14 and 16 may be attached together at their periphery by adhesive, stitching of other appropriate means.

Textiles suitable for the second pair of textile layers include woven fabric such as aramid or, jersey knit layers, or other textile layers with adequate air permeability so as to not restrict breathing. In one embodiment these layers are hot-melt adhesively bonded to opposite sides of the first pair of spun bound fabric textile layers. In another embodiment the second pair of textile layers are layered on opposite sides of the first pair of spun bound fabric textile layers and all layers are durably joined at the peripheral edges of the 5 layer composite through adhesive bonding, welding or stitching.

This hot-melt adhesive pattern bonding, if utilized, is also designed to provide sufficient bonding while not significantly interfering with the airflow into and through the fabric. An exemplary hot-melt adhesive pattern bonding method is roto-gravure lamination. It is to be recognized that the volume of adhesive per square inch of fabric may also vary appropriately when associated with corners, stress points, and the like.

The entire assembled composite fabric may be treated with a durable water repellent treatment using a plasma treatment method that does not affect the air permeability of the structure of the fabric 10. In one embodiment a method of plasma treatment includes applying a permanent water and oil repellent treatment on the molecular level throughout the depth of the laminate. An exemplary plasma treatment method is available from P2i in Oxfordshire UK. While causing minimal change to the airflow, this plasma treatment still treats all of the surfaces of all of the layers in situ. Such treatment will also greatly help maintain maximum airflow because the fabric components will no longer be absorbent at all) Such treatment technology may also be utilized to provide not only water repellent properties but also oil repellent properties as well.

Many objects that are handled by humans are explosive in nature or may be damaged by an electrical discharge and their handling must eliminate or at least significantly reduce the possibility of an Electro-Static Discharge (ESD) that might cause the explosive device to explode or render the electronic device inoperative. For example, there is the potential that clothing items of the type mentioned herein may become exposed to a buildup of static electricity, which creates a risk that the clothing item will support an electrical charge and result in a dangerous environment for the equipment or object being handled (electronic or software, ordinance, etc.) and the persons operating the equipment. Therefore, it is preferred that the clothing item made from the fabric disclosed herein exhibit electro-static dissipating properties.

An additional feature of the invention is therefore to impart a cost effective and durable electrical conductive or electro-static dissipative (ESD) performance to the fabric/clothing item using one or more methods. In a first method, a screen printing technology prints on a portion of the clothing item with an electrically conductive ink. The print lay-down of ink is critical to conductivity performance and in the case of the overall concept of the present invention, preventing loss of air permeability of the fabric.

In this first embodiment for providing ESD protection, the printing of a conductive grid (such as utilizing silver ink, for example) may be provided on an inner surface of the outer knit layers 18, 20, where this inner surface is facing the spun bound layers 14, 16. This process serves to make the fabric static dissipative, or Electro-Static Discharge (ESD) resistant. Thus, the fabric's use around explosives and ordinances will be allowed.

In a preferred implementation of this first embodiment of ESD protection of the present invention, an inner surface of at least one of the outer layers 18, 20 of the second pair of textile layers is treated with a printed carbon treatment. The surface can be entirely treated or more preferably, partially treated, such as with a pattern. The placement of the carbon on the inner surface of the outer pair of textile layers 18, 20 is superior to the prior art usage of carbon on an upper surface of the outer layer of the cover, because the carbon on the upper surface is subject to breakage and degradation due to UV solar breakdown.

To ensure protection of the conductive print and long term function, the print is applied ONLY to the inside of at least one of the outer textile layers. Because the print/ink is a water based polyurethane compound with a durable carbon particle component, when the ink is applied to the fabric, there is no significant loss in air permeability. If the print were to be applied to the ePTFE membrane, the very small pore sizes (1.5-3 microns) of the ePTFE membrane would be filled with the ink, blocking a substantial portion of but not all air flow. When the carbon print is applied to the inside of one or more of the outer textile layers, the print adheres to the large yarn fibers and as a result in the woven fabric blocks very little air flow. Openings in the face fabric are order of magnitude 500× larger than those of the ePTFE membrane.

Thus with the ePTFE membrane portion of the item controlling the overall air permeability of the laminate, the conductive ink must be printed on the textile fabric and not on the ePTFE membrane. Effective coverage to attain to meet static dissipation requirements is based upon the level of carbon in the ink and the surface area printed on to the fabric. Trials done to date that provide optimum discharge used a 15-20% print lay down in a diamond shape pattern with approximately 1.5-2.0 mm lines over a 1.0-1.5 square centimeter area.

One compelling aspect of this feature of the invention is that even though the printed ink is located on the inside of the laminate, the porous nature of the various materials and laminate layers used allow volume electrical conductivity through the fabric/layers and thus allow static dissipation through the fabric. Static dissipation or static decay test method Federal Standard 191A and 4046 and NFPA-99 challenges the conductive material to provide decay of 5000 volts in less than 0.5 seconds usually less than 0.1 seconds.

Further testing has shown that the ESD printing on the inside of the laminate does not significantly impact air permeability performance of the membrane and thus does not impact or reduce the level of relative humidity transported through the laminate. A material with ESD printing as described by this feature of the invention can still maintain greater than 1% relative humidity transfer/square foot of surface area/per minute.

In another embodiment for providing Electro-static dissipation, the fabric material may be produced with ESD yarns or fibers (such as carbon fibers) in or as part of the outer layers 18, 20 which provides static dissipative or electrostatic discharge (ESD) or anti-static characteristics.

The present invention is not intended to be limited to a device or method which must satisfy one or more of any stated or implied objects or features of the invention and should not be limited to the preferred, exemplary, or primary embodiment(s) described herein.

Modifications and substitutions by one of ordinary skill in the art are considered to be within the scope of the present invention, which is not to be limited except by the allowed claims and their legal equivalents.

The invention claimed is:

1. An air permeable multilayer fabric comprising:
   an air permeable, multilayer, air filtering fabric, said air permeable multilayer fabric having an overall air permeability rating of greater than 15 CFM, said air permeable multilayer fabric comprising;
   an air permeable central membrane having a top surface and a bottom surface and a first air permeability rating of greater than 15 CFM, said air permeable central membrane configured for blocking particulates having a size of 0.3 microns and larger through said air permeable, multilayer, fabric with a particle blocking efficiency of at least 90%;
   first and second air permeable nonwoven layers, said first air permeable nonwoven layer bonded to said top surface of said air permeable central membrane, and said second air permeable nonwoven layer bonded to said bottom surface of said air permeable central membrane, wherein said first and second air permeable nonwoven layers have a second air permeability rating which is greater than said first air permeability rating of said air permeable central membrane;
   first and second air permeable fabric layers, wherein said first air permeable fabric layer is disposed adjacent an outer surface of said first air permeable nonwoven layer opposite said top surface of said air central membrane, and wherein said second air permeable fabric layer is disposed adjacent an outer surface of said second air permeable nonwoven layer opposite said bottom surface of said air permeable central membrane, and wherein said first and second air permeable fabric layers have a third air permeability rating which is greater than said second air permeability rating of said first and second air permeable nonwoven layers; and wherein at least said air permeable central membrane and said air permeable nonwoven layers are treated with a gas plasma applied fluoro monomer treatment, said gas plasma applied fluoro monomer treatment configured for rendering said air permeable central membrane and said air permeable nonwoven layers oleophobic and hydrophobic.

2. The air permeable multilayer fabric of claim 1, wherein said first and second air permeable fabric layers are jersey knit layers.

3. The air permeable multilayer fabric of claim 1, further including a conductive layer printed on an inside surface of at least one of said first and second air permeable fabric layers that is adjacent at least one of said first and second air permeable nonwoven layers.

4. The air permeable multilayer fabric of claim 1, wherein said air permeable multilayer fabric is fashioned into a garment configured for providing air filtration to a user's respiratory system by placement at least in part in front of a user's mouth and nose, for providing inhaled air filtration to an inhaled airflow for a user's respiratory system; and wherein said air permeable central membrane layer and said first and second air permeable fabric layers are configured such that said particulates blocked by said air permeable central membrane and said first and second air permeable fabric layers can be dislodged by applying an exhale air flow by said user in a direction opposite said inhaled air flow.

5. The air permeable multilayer fabric of claim 1, wherein said first air permeable nonwoven layer is bonded to said top surface of said air permeable central membrane in a bonding pattern which maintains an overall air permeability of greater than 15 CFM for the bonded, air permeable multilayer fabric, and wherein said second air permeable nonwoven layer is bonded to said bottom surface of said air permeable central membrane in a bonding pattern which maintains an overall air permeability of greater than 15 cfm for the bonded, air permeable multilayer fabric.

6. The air permeable multilayer fabric of claim 1, wherein said first air permeable fabric layer is bonded to an outer surface of said first air permeable nonwoven layer opposite said central membrane in a bonding pattern which maintains an overall air permeability of greater than 15 CFM for the bonded, air permeable multilayer fabric, and wherein said second air permeable fabric layer is bonded to an outer surface of said second air permeable nonwoven layer opposite said air permeable central membrane in a bonding pattern which maintains an overall air permeability of greater than 15 CFM for the bonded, air permeable multilayer fabric.

7. The air permeable multilayer fabric of claim 6, wherein said first air permeable nonwoven layer is ultrasonically point bonded to said top surface of said air permeable central membrane and said second air permeable nonwoven layer is ultrasonically point bonded to said bottom surface of said air permeable central membrane.

8. The air permeable multilayer fabric of claim 7, wherein said first air permeable fabric layer is hot-melt adhesively bonded to an outer surface of said first air permeable nonwoven layer opposite said air permeable central membrane and wherein said second air permeable fabric layer is hot-melt adhesively bonded to an outer surface of said second air permeable nonwoven layer opposite said air permeable central membrane.

9. The air permeable multilayer fabric of claim 1, wherein said an air permeable central membrane is an ePTFE membrane layer.

10. The air permeable multilayer fabric of claim 4, wherein said garment is selected from the group of garments consisting of a face mask, a turtleneck, a balaclava, a scarf, a face shield, a neck gaiter and a shemagh.

11. An air permeable multilayer fabric garment configured for providing air filtration to a user's respiratory system comprising:

an air permeable, multilayer, air filtering fabric garment, configured for placement in part in front of a user's mouth and nose, and for providing inhaled air filtration for a user's respiratory system, said air permeable multilayer fabric garment having an overall air permeability rating of greater than 15 CFM, said air permeable multilayer fabric garment comprising;

an ePTFE membrane layer having a top surface and a bottom surface and a first air permeability rating of greater than 15 CFM, said ePTFE membrane layer configured for blocking particulates having a size of 0.3 microns and larger from said inhaled air for a user's respiratory system through said air permeable, multilayer, air filtering fabric garment, with a particle blocking efficiency of at least 90%;

first and second air permeable nonwoven layers, said first air permeable nonwoven layer ultrasonically point bonded to said top surface of said air permeable ePTFE membrane in a bonding pattern which does not reduce the air permeability of said bonded, air permeable multilayer fabric below a level of 15 CFM, said first and second air permeable nonwoven layers have a second air permeability rating which is greater than said first air permeability rating of said ePTFE membrane;

first and second air permeable fabric layers, wherein said first air permeable fabric layer is hot-melt adhesively bonded to an outer surface of said first air permeable nonwoven layer opposite said ePTFE membrane in a bonding pattern with sufficiently spaced adhesion points to maintain an overall air permeability level of greater than 15 cfm in said bonded, air permeable multilayer fabric, and wherein said second air permeable woven fabric layer is hot-melt adhesively bonded to an outer surface of said second air permeable nonwoven layer opposite said air permeable ePTFE membrane in a bonding pattern with sufficiently spaced adhesion points to maintain an overall air permeability level of greater than 15 cfm in said bonded, air permeable multilayer fabric, and wherein said first and second air permeable fabric layers have a third air permeability rating which is greater than said second air permeability rating of said first and second air permeable nonwoven layers;

wherein said air permeable ePTFE membrane and said air permeable nonwoven layers are treated with a gas plasma applied fluoro monomer treatment, said gas plasma applied fluoro monomer treatment configured for rendering said air permeable ePTFE membrane and said air permeable nonwoven layers oleophobic and hydrophobic; and wherein said ePTFE membrane layer and said first and second air permeable fabric layers are configured such that said particulates blocked by said ePTFE membrane layer and said first and second air permeable fabric layers can be dislodged by applying an exhale air flow by said user in a direction opposite said inhaled air flow.

12. An air permeable multilayer fabric garment configured for providing air filtration to a user's respiratory system comprising:
an air permeable, multilayer, air filtering fabric garment, configured for placement in part in front of a user's mouth and nose, and for providing inhaled air filtration for a user's respiratory system, said air permeable multilayer fabric garment having an overall air permeability rating of greater than 15 CFM, said air permeable multilayer fabric garment comprising;
an air permeable central membrane having a top surface and a bottom surface and a first air permeability rating of greater than 15 CFM, said air permeable central membrane configured for blocking particulates having a size of 0.3 microns and larger from said inhaled air for a user's respiratory system through said air permeable, multilayer, air filtering fabric garment, with a particle blocking efficiency of at least 90%;
first and second air permeable nonwoven layers, said first air permeable nonwoven layer bonded to said top surface of said air permeable central membrane with sufficient coverage to maintain an air permeability of greater than 15 CFM, and said second air permeable nonwoven layer bonded to said bottom surface of said air permeable central membrane with sufficient coverage to maintain an air permeability of greater than 15 CFM, said first and second air permeable nonwoven layers have a second air permeability rating which is greater than said first air permeability rating of said central air permeable membrane;
first and second air permeable fabric layers, wherein said first air permeable woven fabric layer is bonded to an outer surface of said first air permeable nonwoven layer opposite said air permeable central membrane in a bonding pattern with sufficient coverage to maintain an overall air permeability of greater than 15 CFM, and wherein said second air permeable fabric layer is bonded to an outer surface of said second air permeable nonwoven layer opposite said air permeable central membrane in a bonding pattern with sufficient coverage to maintain an overall air permeability of greater than 15 CFM, and wherein said first and second air permeable woven fabric layers have a third air permeability rating which is greater than said second air permeability rating of said first and second air permeable nonwoven layers;
wherein said air permeable central membrane and said air permeable nonwoven layers are treated with a gas plasma applied fluoro monomer treatment, said gas plasma applied fluoro monomer treatment configured for rendering said air permeable central membrane and said air permeable nonwoven layers oleophobic and hydrophobic; and
wherein said central membrane layer and said first and second air permeable fabric layers are configured such that said particulates blocked by said central membrane layer and said first and second air permeable fabric layers can be dislodged by applying an exhale air flow by said user in a direction opposite said inhaled air flow.

13. The air permeable multilayer fabric of claim 12, wherein said an air permeable central membrane is an ePTFE membrane layer.

14. An air permeable multilayer air filtering fabric having an overall air permeability rating of greater than 15 CFM, said air permeable multilayer air filtering fabric comprising:
an ePTFE membrane layer having a top surface and a bottom surface and a first air permeability rating of greater than 15 CFM, said ePTFE membrane layer configured for blocking airborne particulates having a size of 0.3 microns and larger carried by an air flow in a first direction and coming into contact with one of said top or bottom surface of said ePTFE membrane layer from passing through said air permeable, multilayer, air filtering fabric with a particle blocking efficiency of at least 90%;
first and second air permeable nonwoven layers, said first air permeable nonwoven layer bonded to said top surface of said air permeable ePTFE membrane, and said second air permeable nonwoven layer bonded to said bottom surface of said air permeable ePTFE membrane, wherein said first and second air permeable nonwoven layers have a second air permeability rating which is greater than said first air permeability rating of said ePTFE membrane;
first and second air permeable fabric layers, wherein said first air permeable fabric layer is disposed adjacent an outer surface of said first air permeable nonwoven layer opposite said top surface of said ePTFE membrane, and wherein said second air permeable fabric layer is disposed adjacent an outer surface of said second air permeable nonwoven layer opposite said bottom surface of said air permeable ePTFE membrane, and wherein said first and second air permeable fabric layers have a third air permeability rating which is greater than said second air permeability rating of said first and second air permeable nonwoven layers;
wherein said air permeable ePTFE membrane and said air permeable nonwoven layers are treated with a gas plasma applied fluoro monomer treatment, said gas plasma applied fluoro monomer treatment configured for rendering said air permeable ePTFE membrane and said air permeable nonwoven layers oleophobic and hydrophobic; and
wherein said ePTFE membrane layer and said first and second air permeable fabric layers are configured such that said particulates blocked by said ePTFE membrane layer and said first and second air permeable fabric layers can be dislodged by applying an air flow in a second direction opposite said first direction carrying said airborne particulates.

* * * * *